US012745829B2

(12) United States Patent
Tang et al.

(10) Patent No.: US 12,745,829 B2
(45) Date of Patent: Sep. 29, 2026

(54) METHOD AND SYSTEM FOR 3D HAIR VIRTUAL TRY ON USING PHYSICS SIMULATION

(71) Applicant: L'Oreal, Paris (FR)

(72) Inventors: Jason Tsz To Tang, Toronto (CA); Hamza Yousaf, Toronto (CA); Edmund Phung, Toronto (CA); Yi Xin Lok, Toronto (CA); Panagiotis-Alexandros Bokaris, Toronto (CA); Benjamin Askenazi, Toronto (CA)

(73) Assignee: L'Oreal, Paris (FR)

( * ) Notice: Subject to any disclaimer, the term of this patent is extended or adjusted under 35 U.S.C. 154(b) by 295 days.

(21) Appl. No.: 18/420,559

(22) Filed: Jan. 23, 2024

(65) Prior Publication Data

US 2025/0234981 A1 Jul. 24, 2025

(51) Int. Cl.

*A45D 44/00* (2006.01)
*G06T 7/10* (2017.01)

(Continued)

(52) U.S. Cl.

CPC .............. *A45D 44/005* (2013.01); *G06T 7/10* (2017.01); *G06T 7/50* (2017.01); *G06T 7/70* (2017.01);

(Continued)

(58) Field of Classification Search

CPC .. A45D 44/005; A45D 2044/007; G06T 7/10; G06T 7/50; G06T 7/70; G06T 11/10;

(Continued)

(56) References Cited

U.S. PATENT DOCUMENTS

| | | | |
|---|---|---|---|
| 6,381,346 | B1 | 4/2002 | Eraslan |
| 6,453,052 | B1 | 9/2002 | Kurokawa et al. |

(Continued)

FOREIGN PATENT DOCUMENTS

| | | | | |
|---|---|---|---|---|
| CN | 113888398 A * | 1/2022 | ........... | G06T 11/001 |
| KR | 101997702 B1 | 10/2019 | | |
| WO | 2010024486 A1 | 3/2010 | | |

OTHER PUBLICATIONS

Kim et al., "Efficient and Stable Generation of High-Resolution Hair and Fur With ConvNet Using Adaptive Strand Geometry Images", IEEE Access 11 (2023): 81101-81112. (Year: 2023).*

(Continued)

*Primary Examiner* — Maurice L. McDowell, Jr.

(74) *Attorney, Agent, or Firm* — Christensen O'Connor Johnson Kindness PLLC

(57) ABSTRACT

The methods, systems, devices and techniques in accordance with embodiments herein aim to bring a novel approach to Hair Virtual Try-on by replacing the natural hair of the user with a 3D representation (e.g. mesh, point cloud, implicit function, etc.) that mimics how real hair behaves. In an embodiment a physics simulation of at least one force deforms the 3D hairstyle. In an embodiment, the 3D representation includes the details and texture information independently of the color to allow accurately calculation of the resulting color. In an embodiment, the hair color is applied in response to ambient light conditions as estimated. The 3D representation can be segmented by groups of hair strands (aka "mèches" of hair) which helps with achieving vertical recoloring such as highlights, contouring or balayage (a highlighting technique applied to real hair through painting hair color to create a graduated, more natural looking effect).

25 Claims, 5 Drawing Sheets

500

(51) Int. Cl.
*G06T 7/50* (2017.01)
*G06T 7/70* (2017.01)
*G06T 11/10* (2026.01)
*G06T 15/20* (2011.01)

(52) U.S. Cl.
CPC ............ *G06T 11/10* (2026.01); *G06T 15/205* (2013.01); *A45D 2044/007* (2013.01); *G06T 2200/04* (2013.01); *G06T 2207/10028* (2013.01); *G06T 2207/30201* (2013.01)

(58) Field of Classification Search
CPC ............... G06T 15/205; G06T 2200/04; G06T 2207/10028; G06T 2207/30201; G06T 2219/2021; G06T 11/001; G06T 17/00; G06T 19/00; G06T 19/20; G06T 2219/2012
See application file for complete search history.

(56) References Cited

U.S. PATENT DOCUMENTS

| | | | | |
|---|---|---|---|---|
| 7,418,371 | B2 | 8/2008 | Choe et al. | |
| 8,055,011 | B2 | 11/2011 | Ikeda et al. | |
| 8,249,365 | B1 | 8/2012 | Winnemoeller et al. | |
| 8,797,323 | B2 | 8/2014 | Salvi et al. | |
| 8,884,980 | B2 | 11/2014 | Mallick et al. | |
| 9,058,765 | B1 | 6/2015 | Mallick et al. | |
| 9,367,940 | B2 | 6/2016 | Weng et al. | |
| 9,905,045 | B1 | 2/2018 | Hery et al. | |
| 9,928,601 | B2 | 3/2018 | Aarabi | |
| 10,217,244 | B2 | 2/2019 | Kowalczyk et al. | |
| 10,825,219 | B2 | 11/2020 | Fu et al. | |
| 10,849,408 | B2 | 12/2020 | Skwarek | |
| 11,093,733 | B2 | 8/2021 | Yuan et al. | |
| 2006/0224366 | A1 | 10/2006 | Choe et al. | |
| 2009/0232409 | A1 | 9/2009 | Marchesotti | |
| 2011/0063291 | A1 | 3/2011 | Yuksel | |
| 2011/0304623 | A1 | 12/2011 | Tamstorf et al. | |
| 2012/0075331 | A1 | 3/2012 | Mallick et al. | |
| 2013/0215139 | A1 | 8/2013 | Xie et al. | |
| 2014/0233849 | A1* | 8/2014 | Weng | G06T 11/60 382/154 |
| 2015/0054825 | A1* | 2/2015 | Weng | G06T 7/251 345/420 |
| 2016/0154993 | A1 | 6/2016 | Aarabi | |
| 2016/0335987 | A1 | 11/2016 | Mazzola | |
| 2017/0206678 | A1 | 7/2017 | Kowalczyk et al. | |
| 2018/0005448 | A1* | 1/2018 | Choukroun | G06T 5/50 |
| 2018/0039745 | A1 | 2/2018 | Chevalier et al. | |
| 2018/0374242 | A1 | 12/2018 | Li et al. | |
| 2019/0035133 | A1* | 1/2019 | Jiao | G06T 7/251 |
| 2019/0035163 | A1* | 1/2019 | Skwarek | G06V 40/165 |
| 2019/0051048 | A1* | 2/2019 | Zhou | G06V 10/764 |
| 2020/0196936 | A1 | 6/2020 | Blank | |
| 2020/0219328 | A1 | 7/2020 | Yau et al. | |
| 2020/0320748 | A1 | 10/2020 | Levinshtein et al. | |
| 2020/0334868 | A1 | 10/2020 | Zilly Claude et al. | |
| 2020/0336705 | A1 | 10/2020 | Mouizina et al. | |
| 2021/0074076 | A1 | 3/2021 | Powers | |
| 2021/0142539 | A1 | 5/2021 | Ayush et al. | |
| 2021/0264576 | A1 | 8/2021 | Sun et al. | |
| 2021/0406996 | A1 | 12/2021 | Yu et al. | |
| 2021/0407216 | A1 | 12/2021 | Peng et al. | |
| 2022/0005189 | A1 | 1/2022 | Perrot et al. | |
| 2022/0084226 | A1 | 3/2022 | Uludag | |
| 2022/0101577 | A1 | 3/2022 | Chakrabarty et al. | |
| 2022/0198830 | A1 | 6/2022 | Li et al. | |
| 2022/0211593 | A1 | 7/2022 | Bowker et al. | |
| 2022/0366607 | A1 | 11/2022 | Bojan et al. | |
| 2022/0392025 | A1 | 12/2022 | Mironica et al. | |
| 2023/0343053 | A1* | 10/2023 | Scapel | G06T 13/80 |
| 2024/0177360 | A1 | 5/2024 | Hong | |

OTHER PUBLICATIONS

International Search Report and Written Opinion mailed May 19, 2025, issued in corresponding International Application No. PCT/EP2025/051448, filed Jan. 21, 2025, 21 pages.

Ward. K., et al., "A Survey on Hair Modeling: Styling, Simulation, and Rendering", IEEE Transaction on Visualization and Computer Graphics, vol. 13, No. 2, Mar. 1, 2007, 21 pages.

Vanakittistien, N., et al., "Game-ready 3D hair model from a small set of images", Computer Animation and Virtual Worlds, vol. 30, No. 2, Jul. 5, 2018, 13 pages.

Chai, M, et al. "A Reduced Model for Interactive Hairs", ACM Transactions on Graphics, vol. 33, No. 4, Jul. 27, 2014, 11 pages.

Gaelle, M, et al., "Grooming for Real-Time Realism: Hair and Fur with Unreal Engine", White paper, Apr. 27, 2021, 34 pages.

Isola, P., et al., "Image-to-Image Translation with Conditional Adversarial Networks," arXiv:1611.07004v3, <https://arxiv.org/pdf/1611.07004>, Nov. 2018, 17 pages.

* cited by examiner

500

METHOD AND SYSTEM FOR 3D HAIR VIRTUAL TRY ON USING PHYSICS SIMULATION

FIELD OF THE INVENTION

This application relates to image processing, including applying an effect to an object in an input image to define an output image, and more particularly to applying a three dimensional (3D) effect to hair and including a method and system for 3D hair virtual try on (VTO) using physics simulation.

BACKGROUND

Realistic hair recoloring in the context of real time VTO is a challenging topic because of the organic nature of hair and the high number of details required to have a good realism. "Real time" in this context relates to a VTO experience where live video, such as a selfie video capture by a smartphone, tablet or webcam (which examples are not to be limiting), is processed and an effect is applied in real time to simulate a product or service effect such as a hair coloring effect to the display of the live video. Traditional techniques usually involve detecting the hair area in the image (hair segmentation) and recolor the pixels using some color mapping. While being efficient this technique has some drawbacks, for example it is highly dependent on the quality of the input. If the input lacks texture and details (in the case of very dark hair as an example), those details are not reconstructed during the recoloring and the results look poor or worse for any lighter shade tried on as such lighter shades usually exhibit more texture and details.

Another drawback is that consumers want to try different types of hair coloration, including highlights, balayage, contouring, and more styles of recoloring. These types of effects treat components or portions of hair differently e.g. applying different colors to the different portions. Conventional hair tracking and coloring produces unsatisfactory results. Current technology makes it practically impossible to confidently track the same strand of hair upon a sequence of frames (like in a video feed).

Prior work for a 3D hair VTO includes patent references KR101997702B1 entitled "3D simulation system for hair-styling", granted 1 Oct. 2019 (published as KR20190052832A on 17 May 2019) and PCT/KR2008/005109 filed on 1 Sep. 2008 (published as WO2010024486A1 on 4 Mar. 2010). These references describe a system for simulating 3D hair on a user in real time. However, these patents focus on changing the hairstyle of the user rather than applying an effect to a preserved hairstyle.

SUMMARY

The methods, systems, devices and techniques in accordance with embodiments herein aim to bring a novel approach to Hair Virtual Try-on by replacing the natural hair of the user with a 3D representation (e.g. mesh, point cloud, implicit function, etc.) that mimics how real hair behaves. In an embodiment a physics simulation of at least one force deforms the 3D hairstyle. In an embodiment, the 3D representation includes the details and texture information independently of the color to allow accurately calculation of the resulting color. In an embodiment, the hair color is applied in response to ambient light conditions as estimated. The 3D representation can be segmented by groups of hair strands (aka "mèches" of hair) which helps with achieving vertical recoloring such as highlights, contouring or balayage (a highlighting technique applied to real hair through painting hair color to create a graduated, more natural looking effect).

In an embodiment, user input is received to segment (i.e. group) the hair strands in accordance with the input, for example, allowing a user to select adjacent hair strands and define multiple groups.

In accordance with embodiments herein, the hairstyle of the input frame(s) is preserved and the hair color changed to match a hair coloring product. As part of this hairstyle preservation, a machine learning model is used to infer characteristics of the user's hair and choose the closest matching hair model.

In accordance with embodiments herein, a set of intuitive parameters is used to control the color placement, shine, and intensity as well as the ability to use multiple hair colors simultaneously.

In accordance with embodiments herein, a physics simulation approach is used where the hair strands react in a physically plausible way in response to the user's head movements, gravity, and collisions of the strands against the user's head and body.

To further improve realism, in accordance with embodiments herein, a machine learning model is used to estimate the environment map of the user's surroundings and the map is used to light the 3D hair mesh in a way that matches the environmental lighting.

The following statements provide various aspects and features disclosed in the embodiments herein. These and other aspects and features will be apparent to those of ordinary skill in the art such as computer program product aspects. It is also understood that computing device or system aspects/features may have respective corresponding method aspects/features and vice versa.

Stmt 1: A system comprising: at least one processor; and at least one memory device storing computer readable instructions that, when executed by the at least one processor, cause the system to: process an input image using a three dimensional (3D) face detector network to determine a 3D representation of a face of a head, the input image comprising the face and the head; determine a 3D hairstyle model of a 3D hairstyle to be applied to the input image; render the 3D hairstyle from the 3D hairstyle model to define an output image, wherein to render is responsive to one or more of: a physics simulation of hair movement and hair position of the 3D hairstyle to be rendered, the physics simulation responsive to the 3D representation of the face and the physics simulation modeling at least one force and deforming the 3D hairstyle in accordance with the at least one force; or a hair color to recolor the hair of the 3D hairstyle model, the hair color refined in accordance with an estimation of ambient light conditions; and provide the output image for display by a display device.

Stmt 2: The system of Stmt 1, wherein the computer readable instructions that, when executed by the at least one processor, cause the system to provide one or more interfaces to at least one of: receive input identifying one or more of the 3D hairstyle or the hair color for rendering; recommend VTO options comprising one or more of 3D hairstyles or hair colors for selecting to identify for the rendering; perform a transaction to purchase a product associated with the 3D hairstyle or the hair color.

DETAILED DESCRIPTION

System Overview

Figure 1:
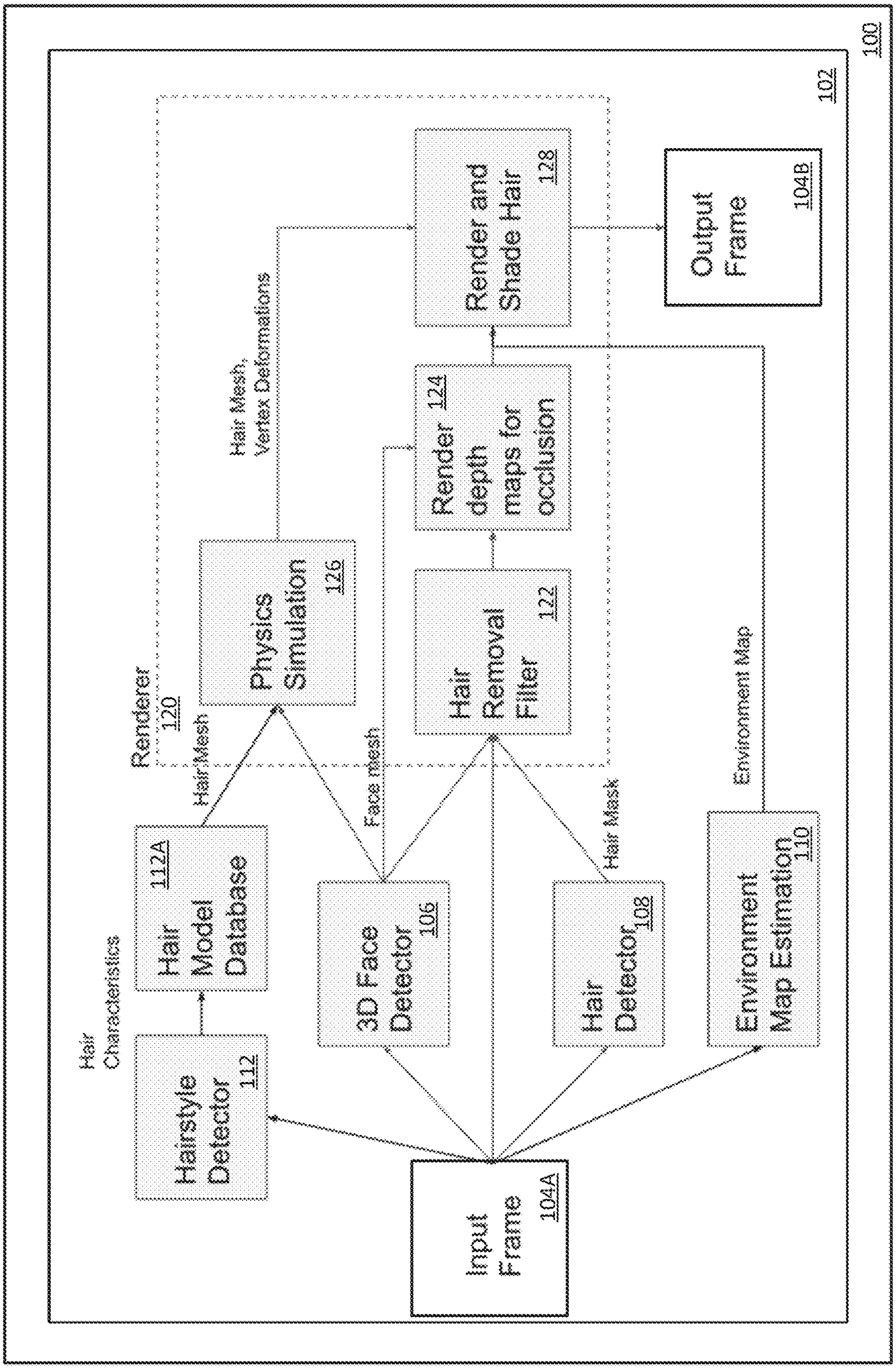
FIG. 1 is block diagram of a system, in accordance with an embodiment.

FIG. 1 is a block diagram of a device 100 having one or more storage devices 102 storing a plurality of components (e.g. software and or data components), in accordance with an embodiment, that operate to provide a 3D hair VTO application. Device 100 is typically a consumer user device such as a smartphone, tablet, laptop, desktop, etc. Often such device types have or are coupled to a camera to originate video comprising a sequence of images/video frames for use in a VTO application. In an embodiment, an input image 104A is processed to render an output image 104B. Image 104A can be a single "still" image (e.g. provided by a user (not shown)) or a frame extracted from a feed of a camera (not shown) or from any input video. Output image 104B is typically, but need not be, of a same type, meaning image 104B is a corresponding still image or an image of a video feed for display, etc.

Image 104 is processed by a plurality of components including: a 3D face detector 106; a hair segmentation component 108, an environment map estimation component 110 and a hairstyle detector component 112.

3D face detector 106 operates to detect a 3D representation of a face, providing a face a 3D representation (e.g. a mesh) and associated data as further described. Preferably one or both of a position of the face, and a rotation of the face are also determined. Hair segmentation component 108 detects where the hair is in the image, providing a segmentation mask indicating hair and not hair pixels. Environment map estimation component 110 estimates an environment map primarily related to lighting. Lighting environment map comprises an HDR environment panorama (map) having data (e.g. colored pixels) to locate key direction light sources and estimate ambient light color. Though a mesh is often described as a type of 3D shape representation herein, other manners of representing 3D shape can be employed such as point cloud, implicit function, etc.

In the embodiment, hairstyle detector component 112 detects a hairstyle in image 104A and locates (e.g. performs a look up to match) a corresponding 3D style definition (e.g. as defined by a 3D artist) stored to hairstyle data store 112A (e.g. a data base 112A) for use as further described. Though not shown in FIG. 1, a non-matching hairstyle (e.g. a different style, which can be (user) selected) from store 112A can be used to replace the hair of image 104A.

A plurality of rendering components (e.g. that define a renderer 120) process the outputs of components 106, 108, 110 and 112/112A. A hair removal filter component removes detected hair from image 104A responsive to the hair mask and performing an in-painting on the image. The result of the in-painting technique is enhanced by applying a bald filter on the head (that is a 3D mesh of a scalp oriented and positioned using the output of (2) and re-colored with the user's skin color). This bald filter improves the rendering by masking the real hair of the user. In an alternate embodiment, not shown, a bald filter is not employed. Rather, users having long hair or other hairstyle with large hair volume (e.g. spiked hair, among others) that interferes with a 3D hairstyle to be applied are instructed to apply for the input image a tight ponytail or other tight hairstyle that preferably conforms to the shape of the user's head to hide and/or minimize the user' hair (i.e. hair volume) to improve rendering of the 3D hairstyle to be applied. Though not shown, in an embodiment, a hair detector function is provided to process the input image, for example, by evaluating a hair segmentation mask or by using a hair volume classifier, to determine that a user should apply the hair hiding/minimizing style to improve results. In an embodiment, the user can decline and proceed in any event.

An occlusion detector component 124 determines occlusions and renders a depth map.

A physics simulation component 126 models hair physics for movement, gravity, etc., using guided strands to adjust the hair mesh that models the 3D hairstyle. From face mesh and hair mesh data, an approximation of the user's head, neck, and shoulder is made to serve as a collision mesh. The collision mesh (e.g. a collision 3D shape representation) is used with a set of "guided strands" to compute the physics simulation of the hair movement and position. The guided strands are used to deform the hair model (previously designed by a 3D artist).

A hair renderer component 128 renders the hair according to the deformed 3D model, etc. That is, hair is re-colored using state-of-the-art techniques and the rendering is further improved using the environment map. Output image 104B is provided, for example, sent to a display device such as a display screen for display. Output image 104B can be saved to a storage device or communicated (e.g. shared) with another device such as via email text, social media, etc.

Components

Face and Hair Detection

In embodiments, renderer 120 utilizes information about the 3D structure of the face in the form of a 3D mesh. To facilitate this, a 3D face mesh detector is used. In an embodiment, the 3D face mesh includes the frontal portion of the face, most of the forehead, as well as the sides of the face reaching as far back as the ears. Simulation accuracy can be optimized when the mesh provided by the detector also includes the scalp, neck, and shoulders, but these can be added onto the mesh as a post-processing step if not available.

In embodiments, hair removal filter component 122 uses the 2D segmentation mask of the hair. To do this, a machine learning model can be used that estimates the segmentation mask given an input image.

For both of the respective face and hair detectors 106 and 108, an "off the shelf" solution or a custom built detector can be used. Here, "off the shelf" references a pre-existing component that need not be wholly created from the beginning. Some refinement for the specific purpose(s) at hand may be used, for example, trained to provide the desired outputs or a desired form thereof. In an embodiment, with a custom built detector, the machine learning models for 3D face mesh detection and 2D hair segmentation can be merged together for optimal speed. Additionally, the scalp, neck, and shoulders can be included in the mesh output which is typically not found in an "off the shelf" 3D face detector.

Hairstyle Detection

In an embodiment, to preserve the hairstyle of the user, a machine learning model is used at hairstyle detector 112 to detect the characteristics of the user's hair through processing an image. In an embodiment, the detected characteristics include color (including any information about highlights or multiple colors), texture (afro, straight, curly, wavy), length, visibility (visible, covered, bald), and whether the hair is tied, braided, or has bangs.

In an embodiment, the characteristics are used to choose the closest matching hairstyle from database 112A of 3D hair models, as well as adjusting the physics parameters to better match the physical behavior of the style.

Hair Removal

In an embodiment, for better realism, the user is made bald virtually by hair removal filter 112 before the new hair model is rendered on top. That is, the hair in the image is removed such as by masking. In an embodiment, filter 122 performs the following steps:

Removal-1: The hair segmentation mask is dilated to increase its coverage area.

Removal-2: An in-painting technique such as in accordance with a known technique (e.g. the fast marching method (Telea, 2003)) is used to erase and re-construct the erased region, using the mask from the previous step as the region. In an embodiment, as a performance optimization, the mask can be downsized before using the algorithm.

Removal-3: A scalp mesh is aligned with the face mesh if the face mesh does not include the scalp. If the face mesh already includes the scalp, then the scalp can be extracted from the face mesh.

Removal-4: The scalp mesh is rendered onto the image, with a skin material of a similar skin tone to the face using standard physically based rendering (PBR) techniques. In an embodiment, the skin tone is estimated by averaging all the skin pixels of the face. In an embodiment, Poisson blending is also applied to smooth the transition between the original face and rendered scalp.

In an alternative embodiment, the existing hair is removed in another manner. For example, a GAN model (not shown) can be provided to process the input image and remove the hair. In such an embodiment, a hair segmentation mask may not be used.

3D Hair Rendering

Hair Model Representation

In an embodiment, system 100 supports two different hair model representations. The first is a hair cards model where the hair is modeled using cards (3D rectangular planes) where each card contains a texture with hairs grouped together and a transparent background. The advantage of this representation is that it is efficient in terms of both memory usage and simulation time, but is less realistic as system 100 does not have fine grained control over the individual strands. For example, system 100 can only simulate the physics for the hair card as a whole and not the individual strands. Such a model is ineffective for complex hair geometry, such as curly hair.

The second representation is with hair curves. The hair model consists of a set of Bézier curves, with each curve representing a strand of hair. This representation provides greater realism and control over the individual strands but requires more memory and simulation time.

Memory Efficient Hair Curve Representation

In an embodiment, to reduce both the storage and RAM requirements of the hair curve representation, a number of optimizations have been developed. Normally, cubic Bézier curves are used to model a hair strand which requires two control points per curve. As an optimization, quadratic Bézier curves (requiring one control point) are used instead when a hair curve can be sufficiently approximated using the quadratic Bézier curve, falling back to a cubic Bézier curve otherwise.

Additionally, for hairstyles that are symmetric, only one side of the hairstyle is stored and the other side is mirrored when the hair model is loaded.

To reduce storage requirements, the curve points can be stored in a binary format and compressed with a standard lossless compression algorithm.

Hair Card Direction Map Editor

When using a hair card representation, a direction map texture is defined that specifies the 2D strand direction for every pixel on the hair card. The strand direction information is required by the shading model.

Figure 2:
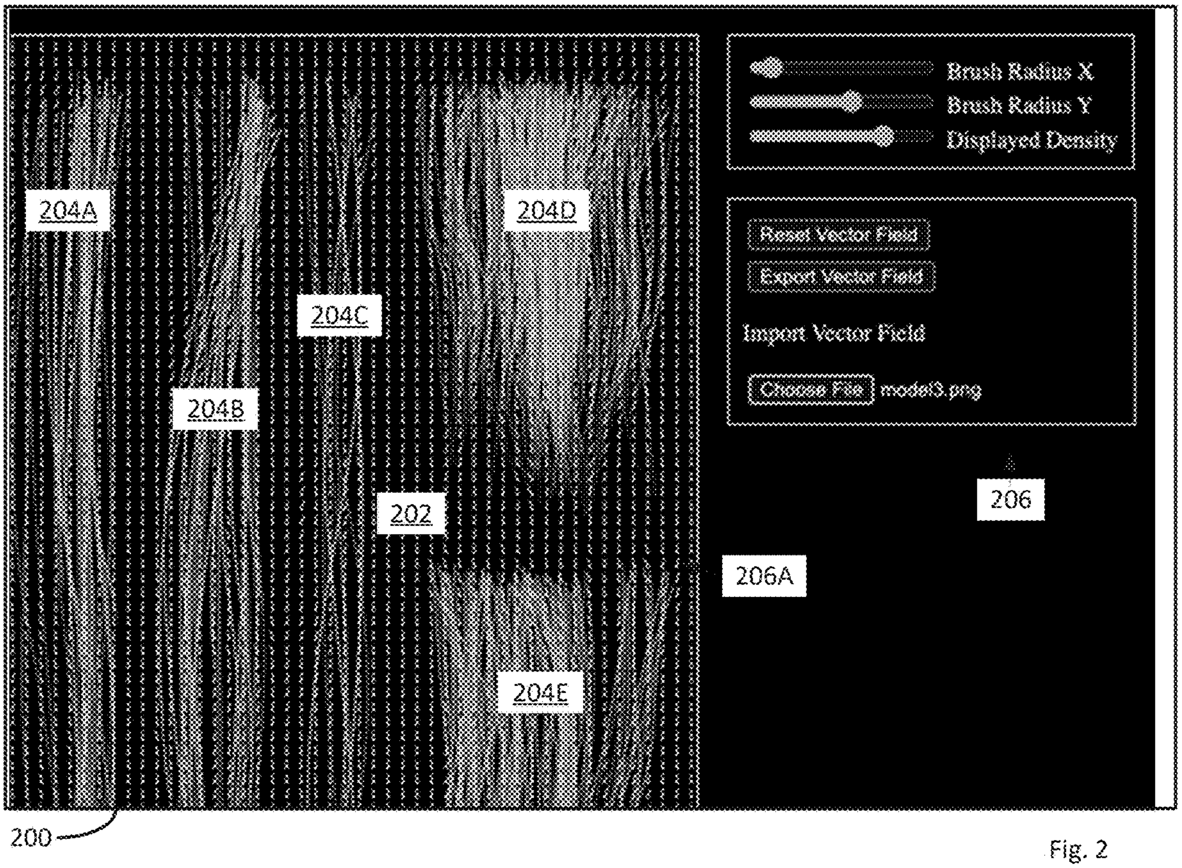
FIG. 2 is representation of a graphical user interface, in accordance with an embodiment.

However, defining this direction map texture is difficult to do using the standard image editing tools available. In an embodiment, to facilitate this, a custom tool allows an artist or developer to define a direction map in an intuitive way by manipulating a vector field using a mouse or touch controls. The vector field is displayed on top of the hair strand texture as a grid of arrows (e.g. vectors), and the user can drag their mouse or finger to align the arrows with the direction of the strands. FIG. 2 shows a portion of a graphical user interface 200 (e.g. that can be displayed on a display screen) presenting a vector field 202 presented on a plurality of hair strands, for example, hairs strands in groups 204A, 204B, 204C, 204D and 204E, as well as a plurality of GUI controls 206. The vector field 200 comprises a grid of short vectors represented as short line segments (e.g. 206A) each having a direction. The segments may each be represented by an arrow construct such as a line segment with a dot for compactness in the interface. In an embodiment the dot at an end shows and origin for the arrow, the line angles therefrom to show direction. The direction of these vectors is manipulated using a gestural input such as by drawing/dragging along the hair using a pointing tool (e.g. a mouse, a stylus, etc.) or a finger, etc. In an embodiment the display screen is touch sensitive input device. The card is defined from the values of the vectors in the field 202. Controls 206 are provided to define a brush (e.g. dimensions) that is operated by the gestural input (e.g. tool or finger, etc.) as well as to import hair image. Reset the vectors values of the field 202 or export the values of the field 202 to define the card. In an embodiment, the vector field is used to form a direction map texture that gets mapped onto the hair card. Multiple textures are mapped onto each hair card, where each texture contains different information (for example, one texture contains the direction of the strands, and another texture contains the color and opacity of the strands). Within each texture are multiple clusters of hair. When a texture is mapped onto a card, only a subregion of the texture containing a specific hair cluster is used.

Hair Shading Model

To render the hair model, in an embodiment a Marschner hair shading model is used in with some modifications to enable execution in real time. An optimization used is to pre-compute the azimuthal and longitudinal scattering functions for different angle inputs and store the result into a look-up table (LUT). Additionally, the Marschner model requires performing a mathematical integration of the scattering equation over all light directions. In an embodiment this integration can be simplified into a summation over the different light sources by using discrete light sources (such as point light sources or directional light sources). This will be discussed further in the next section.

Environment Map Lighting Approximation

To improve realism, an environment map is used (e.g. at component 110) to model light coming from all directions in the user's environment. This can for example be represented using a high dynamic range (HDR) panoramic image. However, using the environment map with the Marschner shading model requires integrating the scattering equation over the entire environment map which cannot be done in real time. In an embodiment, as an approximation, the environment map is converted into a set of discrete light sources. This conversion is done by detecting the brightest spots in the environment map and finding the average color for each spot to determine the light color and intensity. Each bright spot is converted into a directional light source.

Indirect Lighting Using Dual Scattering

For realistic hair rendering, indirect lighting is simulated in accordance with an embodiment. Indirect lighting refers to light rays originating from light sources that have experienced more than one ray-surface interaction (surface being the hair in this case) before reaching the virtual camera. A ray-surface interaction can either be a reflection (where the light ray bounces from the surface) or transmission (where the light ray enters the surface).

For example, a light ray emitted by a light source might interact with many hair strands before reaching the camera. An example of this is a light source that is behind the hair. Each time a ray-surface interaction occurs, the direction, color, and intensity of the light ray changes. The effect of indirect lighting is most noticeable for lighter hair colors (such as blonde hair).

Precisely simulating all of these light rays in real time can involve millions of light rays and hundreds of thousands of hair strands. The computational cost also grows exponentially with the number of bounces/transmissions per ray since a single ray is scattered into multiple rays with each surface interaction.

In an embodiment, the dual scattering technique is employed to solve this problem. By approximating the aggregate behavior of light rays using statistical models, the system does not need to simulate every ray and ray-surface interaction which allows indirect lighting to be approximated in real time. In an embodiment, the hair shading model incorporates this technique.

Recolorable Dual Scattering LUTs

As part of the dual scattering technique, various LUTs are pre-generated as an optimization. However, these LUTs depend on the hair color and the LUTs are re-calculated if the hair color changes. If there are multiple hair colors being applied simultaneously, multiple sets of LUTs would need to be generated which consumes more memory and increases the loading time.

To optimize dual scattering and LUT generation, a modification was made to the dual scattering technique where an extra dimension was added to the input of the LUT for one channel of the input color. For example, when using an RGB hair color, the LUT would be applied separately to each channel of the RGB color. This allows the hair color to change without having to re-compute the LUTs.

Occlusion Handling

In a 3D model of hair for application to a head, parts of the hair are occluded by the head, neck, and shoulders when the head is viewed from a particular point of view. In an embodiment, a depth map is used to keep track of the depth of all pixels rendered during the rendering operations. This depth map is initialized with depth of the face, neck, and shoulders such as in accordance with a standard approach in computer graphics to handle occlusion.

When rendering the hair, the hair geometry (whether hair cards or curves) is rasterized into pixels by the GPU. Before rendering each pixel, the depth of that pixel is checked against the depth in the depth map at the current image position. If the depth is further than the one in the depth map, the pixel is not rendered. Otherwise, the pixel is rendered (overwriting any existing pixel in the same image position) and the depth map is updated.

If using hair cards, the rendering process also needs to check if the current pixel is transparent. If transparent, it will not render the current pixel regardless of depth.

Hair Swatch Color Transfer

Figure 3:
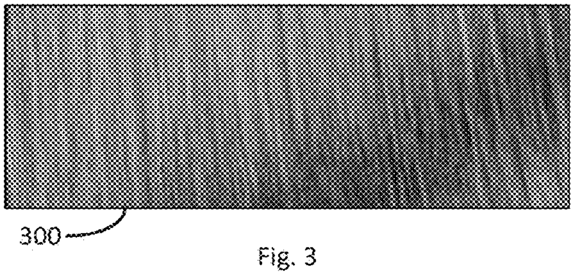
FIG. 3 is an image of a color swatch, in greyscale for convenience and in accordance with an embodiment.

To support rendering of real life hair coloring products such as to provide a virtual try on of a specific product, hair renderer 120 (e.g. at component 128) is configured to receive a hair swatch representing a hair coloring product. FIG. 3 shows a representative swatch 300. Though shown as a grayscale image for the filing the image is typically a color based image representing the product color (e.g. an RGB image).

A swatch is able to capture a wide distribution of colors from the product, as opposed to using a single color. Each hair model such as used in system 100 includes a hair texture that is mapped onto the mesh or strands. The distribution of colors from the hair swatch is transferred to the hair texture using a histogram matching process. This process is described in more detail in U.S. patent application Ser. No. 18/109,310, filed Feb. 14, 2023, the contents of which are incorporated herein by reference in their entirety. For example, in an embodiment, a computer implemented method comprises executing on a processor one or more steps comprising: mapping gray levels from a swatch image and gray levels from a hair portion of an input image by matching their respective frequencies to establish a map relationship between the swatch image and the hair portion, wherein the gray levels of the swatch image are associated to respective swatch color values; and coloring a pixel in the hair portion based on a swatch color value determined using a gray level of the pixel and the map relationship.

In an embodiment, the respective frequencies are probabilities of the gray levels occurring in the swatch image or the hair portion, respectively. In an embodiment, the frequencies are represented by histograms or by cumulative distribution functions. In an embodiment, the method further comprises calculating a mapping table that maps the gray levels from the hair portion to the swatch color values. In an embodiment, coloring the pixel of the hair portion is performed by a Graphics Processing Unit (GPU) using a shader. In an embodiment, the mapping table is provided to the shader using a 1D texture. In an embodiment, the method comprises preprocessing the swatch image or the input image using a deep neural network to improve accuracy of the coloring of the pixel in the hair portion. In an embodiment, an output image can be displayed comprising the input image and the hair portion as colored. The output image can be processed using a guided filter.

Strand Variation

In a real life situation, the color of the hair is generally not uniform. This is particularly true with lighter-colored hair. Using the hair swatch color transfer technique above, the re-colored hair texture provides this variation. To give more control over the variation, there are some adjustable parameters for the frequency and scale of the variation. The frequency will control the amount of detail in the variation, whereas the scale will determine how close together strands of similar color will appear.

Frequency is implemented by blurring the hair texture to reduce details, while scale is done by adjusting the texture mapping so that the texture is more compressed or stretched relative to the hair surface.

Additionally, for blonde hair it is common for the top part of the hair near the roots to be more faded. The renderer (component 128) exposes parameters to control the fading and color for the roots.

Smoothing and Anti-Aliasing

In an embodiment, techniques of smoothing and anti-aliasing are used to augment the 3D hair rendering. In particular, when the 3D hair mesh is rendered in the scene, the higher resolution texture of the mesh appears very pixelated. This is especially visible on loose hair strands, and when the hair is in motion. To make the experience less jarring, there is applied a Box Blur and Poisson Blending algorithm to the edge of the 3D hair mesh, which softens the pixelation of the loose strands on the edges, which are the most visible. As noted, the 3D hair mesh could be hair cards, in an embodiment. As noted, the 3D hair mesh could be hair curves, in an embodiment. When rendering the hair, in an embodiment, each pixel has an opacity value in addition to its RGB color. Since edges typically have an opacity greater than 0 but less than 1 due to anti-aliasing, these values can be used as an easy way to identify the edges. Similarly, a Multisample anti-aliasing (MSAA) technique is used in an embodiment to reduce the pixelation of all the hair strands in the mesh, so that a more natural-looking result is achieved that blends better with the video resolution.

In an embodiment, hair strands can be smaller than a pixel in thickness. In order to achieve this, the hair is rendered at a higher resolution than the resolution of the output image and then downsized. The resulting strands appear smaller than a pixel and also look smoother due to the interpolation used in the downsampling.

Multi-Color Placements

In an embodiment, hair rendering by component 128 is capable of applying multiple colors simultaneously to the hair mesh. These color segments can be arranged horizontally, vertically, or as root recoloring on the mesh.

For the horizontal placement, in an embodiment, the mesh is segmented into multiple sections based on the hair strands' length, and the colors applied to each of these sections. For example, a color can be applied only to a section near to the root of the hair strand on the scalp, For example, a color (e.g. a different color) can be applied to just the section on the tip of the hair strands. Everywhere else in-between, boundaries can be defined for the horizontal sections, and colored accordingly. To smooth out the transition of colors, a color gradient is applied in between each of the sections.

For the vertical placement, in an embodiment, the 3D representation (e.g. the 3D mesh segments the hair strands into multiple groups, and the colors are applied to each of these groups. Note that in this case, the groups can include non-contiguous clumps of strands. For example, in one instance, a color can be applied to the group of strands at the front of the head, creating a framing effect for the face, or in another instance, we a color can be applied to small clumps of strands throughout the mesh, to create a streak highlight effect. To smooth out the transition of colors the color of adjacent hair strands that do not belong to the same group are adjusted, and the color of the different groups blended to produce a visually transitional color for that strand. In an embodiment, user input is received to segment (i.e. group) the hair strands in accordance with the input, for example, allowing a user to select adjacent hair strands and define multiple groups. Coloring can be applied to these interactively defined groups.

For root recoloring, in an embodiment, there is a control of how much of the underlying user's hair root color to expose. A root color parameter controls how much of the original root color should be exposed, and a root bleed parameter controls how much of the original root color should bleed into the new hair color.

Shadows

In an embodiment, hair render 120 is enabled to apply two types of shadows. The first type of shadows are those that the head and hair strands cast on the hair model itself. The second type of shadows are those that the hair casts onto the head. For both shadows, two types of depth maps are rendered from the perspective of the light sources: one depth map is that of the entire hair and head; and one is of just the hair. These depth maps are used to apply shadowing to the hair and head respectively. The depth value of each pixel is compared against that of the corresponding depth value in the depth map; if the pixel's depth is greater than the depth map value, then the pixel is considered in shadow.

For the hair, the shadow value is used to determine whether the current pixel on the hair will be in shadow. In response to being in the shadow, the shadow color is blended with the final hair color. For the head, the shadow color is applied to the pixel in shadow and rendered onto a blank image. Since each pixel of the head is rendered, the shadow appears in the shape of the head in the blank image.

To remedy the existence of aliasing artifacts, for the shadows on the hair, there is employed a standard technique, called Percentage Closer Filter (PCF), where a pixel being in shadow is determined by the average of its neighbors. Rather than depend on a yes/no type binary result for "in shadow" or "not in shadow" as determined by a depth comparison of the current pixel against the depth map, neighbouring pixels are also respectively compared to using the depth map and a weighted average (e.g. between 0 and 1) is determined. For example, a pixel could be considered 40% in shadow. For the shadows casted on the head, a Gaussian blur is applied to the render of the shadows that were applied to the blank image, which smooths the shadows out at the edges. Finally, these blurred shadows are rendered onto the head.

Physics Simulation

Simulation Overview

Figure 4A:
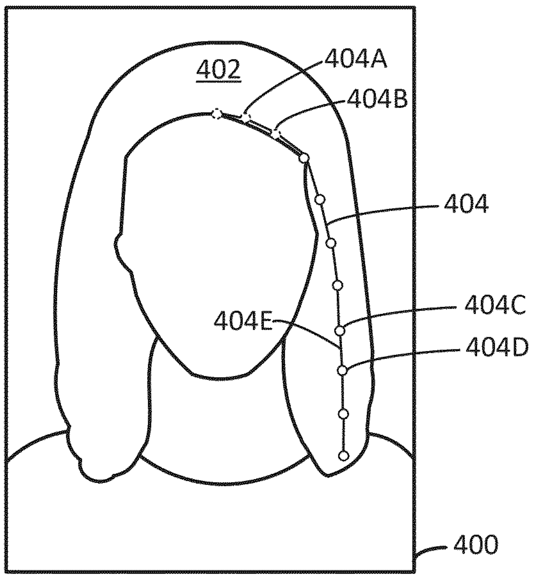
FIGS. 4A and 4B are illustrations of components of a hair model, in accordance with an embodiment.

This section outlines the technique used to simulate the hair movements as they appear in real life such as through the operations of physics simulation component 126. In an embodiment, to achieve this, a programmatic frame is embedded into the hair mesh to guide the movement of the hair strands during the rendering. The frame includes several guiding strands, which are distributed throughout the hair mesh model. In an embodiment, the guiding strands are placed by the designer of the hairstyle, and are chosen to give the most realistic physical behaviour for that hairstyle. For example, 10-20 relatively uniformly distributed guided strands are defined. Like other (e.g. non-guiding) hair strands, these guiding strands start at the root of the hair, and grow out following the shape of the hair mesh. Each hair strand in the hair mesh is mapped to these guiding strands in order to follow the movements of the guiding strands. FIG. 4A shows an image 400 having hair 402 and a representative guiding strand 404 for a hair mesh (not shown).

The guiding strands comprise particles (e.g. 404A, 404B, 404C and 404D) that are linked together by line segments (e.g. 404E). The particles in the guiding strands are separated into two categories: anchored particles (shown in dotted lines such as 404A and 404B) and unanchored particles (shown in solid lines such as 404C and 404D). An anchored particle is a particle that only follows the head position, so it appears "anchored" on to the head, whereas unanchored particles are free to move around. Using these properties, it is enabled to define which part of the hair should stick close to the head, and which part should be free-flowing.

In an embodiment, movement of non-guiding hair strands is determined relative to movement of associated guided hair strands. Operations associate each non-guided hair strand with two closest guided hair strands.

For each strand of hair, a representative vertex on the hair strand at a location that is ¾ (75%) along the hair strand from the root towards the end is determined. The ¾ number is determined empirically to be further from the root because it was determined that the guiding strands are close together towards the root and may result in inaccurate mapping if a vertex closer to the root was chosen. The length along can be 50-80% along, with a preferred length being 75% (i.e. ¾ along). The two closest guiding strands to act as references are located for each particular hair strand. For example, the physical distance (e.g. Euclidean distance) to each of the guiding strands is determined and the closest two determined using these distances. Each vertex on the non-guiding hair strand is mapped to a corresponding segment on each of the two guiding strands. This is also done by finding the shortest distance. During the physics calculation, the vertices' movements (of a non-guiding strand) will be influenced by its assigned line segments from the two closest guiding strands, with the closer guiding strand having more influence than the farther guiding strand.

In an embodiment, hair simulation avoids purely uniform hair movement, as that is not what happens in real life. Each particle in the guiding strand is also assigned a configurable mass parameter, which affects the acceleration it experiences in the physics calculation. This mass is also influenced by how many non-guiding hair strands are assigned to it, with more strands adding to the mass of each of the particles in that guiding strand. In accordance with the assignment of non-guiding strands to guiding strands, hair clumps are defined with the size of a clump being related to the number of co-assigned hair strands, thus defining clumps of different sizes. Clumps move differently depending on how much hair is in that clump. Independent movement for different parts of the hair is achieved, which is more close to what we see in reality.

Simulating Forces

In an embodiment, hair physics simulation is stabilized. A reference strand for each guiding strand is defined to help stabilize the physics rendering. A reference strand is a strand of unanchored particles that only reacts to the simulated forces such as gravity and centrifugal force. Each reference strand defines the movement and bending of the strand as a whole, and the corresponding guiding strand would move around it. In an embodiment, initially, each reference strand is defined to have the same position as its associated guiding strands. In an embodiment, for gravity, it's assumed to be an acceleration of 9.8 m/s^2 in the downward direction. In an embodiment, the downward direction would be the same as the real world downward direction (which is possible if the 3D camera/device orientation is known). Otherwise, the downward direction is relative to the camera/device (for example, if the camera/device was tilted 45 degrees, the gravity direction would also be tilted at the same angle relative to the real world downward direction). In an embodiment, the centrifugal force is calculated based on the average angular velocity of the head, estimated from the change in head rotation over time. In an embodiment, the head rotation is estimated using the vector from the nose to the centre of the head. In an embodiment, the direction of the centrifugal force is from the head center to the end of the beam, but only the perpendicular (to the beam) component of the force is accounted for.

In an embodiment, the bending of each reference strand is modeled as deflections on bendable straight cantilever beams, with one end attached to an anchored particle and the other end being free. Two beams are modelled for each reference strand, one to model bending due to gravity, and one to model bending due to centrifugal force. The beams are constructed from the final anchored particle of the guiding strand (the reference strand particles are non-anchored particles that come after that anchored particle), the reference strand particles are then associated with the beam's deflection at a certain point on the beam. Each cantilever beam is configured to be straight, beginning at the closest anchored particle to the root.

For the beam that models bending due to gravity, the free end of the beam is located directly below the anchored end that has double the length midway down the reference strand, so that the initial shape of the guiding strands and hair strands are preserved when the head is at its initial orientation. That is, the length of the beam is double the length of distance between the vertex midway down the reference strand and the anchored end. The initial orientation is assumed to be not tilted. The deflection of the beam due to gravity is calculated as if the beam experiences constant gravitational force along the entirety of the beam, with the beam having approximated physical properties of 30 hair strands tightly packed along the beam.

For the beam that models bending due to centrifugal force, it is a beam that has double the length of a beam that goes from the anchor to the midpoint of all unanchored particles in the reference strand. The deflection of the beam due to centrifugal force is calculated as if the beam experiences a single centrifugal force at the end of the beam, with the beam having approximated physical properties of 30 hair strands tightly packed along the beam. The single centrifugal force is used as an approximation for case of calculations.

Figure 4B:
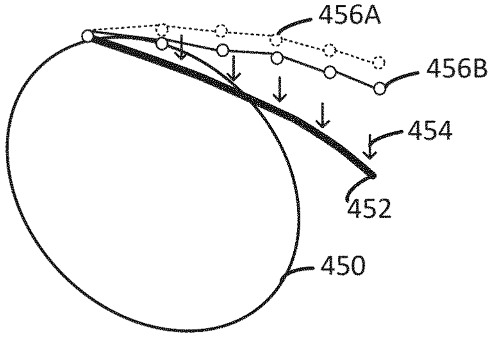

Having calculated the deflections on the two beams due to gravity and centrifugal force, the unanchored particles in the reference strands are then moved from their respective original positions according to the addition of the two deflections on the two beams. For each unanchored particle, its movement due to a beam's deflection is calculated from the deflection at the point on the beam where the unanchored particle's original position is projected onto the beam. FIG. 4B is a representation of the simulation on a titled face 450. The thick black line 452 represents a beam 452. Down arrows (e.g. 454) represent forces. A reference strand is shown in two positions, namely as strand 456A, before application of the forces, and as strand 456B, after application.

In an embodiment, in order for the guiding strands to move around their respective reference strands, there is modeled springs between the guiding strands and respective reference strands and dampers on the guiding strand particles. In an embodiment, multiple iterations of Verlet integration calculations are made per frame to infer the next position of the guiding strand particles due to the forces acting on them by the springs and dampers. In an embodiment, there is added a position modifier that moves each of the guiding strand particles by the head's movement but only along the direction of the strand to make the strand not stretchable and not compressible.

Once the guided strands are moved, the clumps/hair strands associated with a respective guided strand are moved for example, applying the influence of the two guided strands associated with a non-guided hair strand. In an embodiment, each non-guiding strand has two nearest guiding strands associated with it. Additionally, each particle within the non-guiding strand also contains the nearest curve position (e.g. the curve's parametric "t" value) along the two nearest guiding strand's curves. A non-guiding strand is deformed by the guiding strands as follows: 1. For each particle in the non-guiding strand, there is calculated a nearest world position on the two guiding curves. For these nearest world positions, the original world position (before physics was applied) is subtracted from them to give a displacement vector representing the change in position due to physics. World position refers to the (x, y, z) position in world space, the space that contains all objects in the scene. 2. The world position of the non-guiding strand particle is set to its original position shifted by the weighted average of the two displacement vectors. The weight is determined by the relative closeness of the non-guiding particle to the nearest guiding strands, with the closer guiding strand receiving more weight.

In order to have the hair strands to be less uniformly distributed when they are following the guiding strand, in an embodiment, each hair strand is moved towards the nearest or second-nearest guiding strand to achieve a clumping effect. In an embodiment, the amount of movement towards depends on one or more of the following parameters: —velocity of the guiding strand; the higher the velocity, the larger amount clumping effect will be; —how far the hair strand particle is from the root, where the further away from the root, the larger amount of clumping effect; —a user selected amount for the clumping effect that affects all the hair strands; —the number of hair strands that are closest to the guiding strands; the more hair strands are around the guiding strand, the less the clumping effect movement towards that guiding strand such that the resulting clump of hair strands around that guiding strand will appear to be bigger; —randomly generated size factor of the guiding strand that affects the resulting clump size of hair strands around the guiding strand by affecting the clumping effect movement of the hair strands towards the guiding strand (see point above); and —randomly generated ratio that determines how much the hair strand should move towards the nearest vs the second-nearest guiding strand.

Collision Handling

In an embodiment, collision detection is determined for collisions between the hair strands and objects that are convex hull meshes of triangles. In order to improve performance, in an embodiment, the collision detection is approximated by pre-calculating the triangle position of the collision mesh corresponding to each angle with an approximate center of the convex hull. In an embodiment each object in the scene (such as head, shoulders, neck) is represented as a mesh composed of triangles such as using known techniques. The hair strands are still represented as 3D points instead of triangles. Typically, collision detection algorithms only work with meshes that are convex. Intuitively, a convex mesh can be thought of as a mesh that has no "dents" or holes. Since some of the above meshes are non-convex, a convex approximation (called the convex hull) of those meshes are used when doing collision detection. When doing collision detection, the hair curve points are checked against the triangles in the convex hull meshes. This approach is entitled a "spherical approximation" in which the approximation causes the particles to interact with the convex hull "approximately" as if it is a sphere.

In order to mitigate false positives and false negatives, a padding is added during the collision detection to make the calculation more robust. This is done by using a scaling matrix to enlarging the convex hull meshes.

In situations where a hair particle would collide with multiple objects that are very close, in an embodiment, only the first object that the particle came in contact with is recorded. This is to ensure that the particle will not jump back and forth due to simultaneous collisions.

When a hair particle is detected to be collided with another object, the particle is repositioned to be on the surface of the collided object. A configurable damping factor for the particle is added to simulate friction on the object's surface. This damping factor is also applied to all hair particles in the same strand that are below this collided particle (toward the free end), so the segments below will not move as if it's free-flowing, which would look unrealistic.

Lighting Estimation

In an embodiment, the system uses a machine learning model to predict the environment map given a single camera image. The environment map is a HDR panoramic image that models the light coming from all directions. This map is passed to the environment map lighting step in the rendering as described above. A model may be trained using supervised learning to predict and HDR environment, for example, trained using portrait image and HDR environment map paired data. Further, there are known models used to estimate the lighting scene of images that can be classified according to two main categories: regression models that estimate low-dimensional panorama lighting parameters and generative models that generate non-parametric illumination maps or light probes. With the increasing popularity of generative models, there are also image-to-image generative models that directly generate an HDR environment map, such as styleLight. Previous works have explored ways to infer lighting information in real-time augmented reality applications including that of LeGender et al. that first proposed models that predict low-resolution HDR light probes based on limited field-of-view LDR unconstrained images, and later extended the work to focus on predicting light probes based on limited field-of-view LDR portrait images. These models are small models that can infer in real-time on mobile applications. However, since the light probes have low-resolution and only capture the lighting information behind the camera, it limits the realism when using the light probes to render images. To address this issue, Somanath et al. introduced a model that infers high-resolution HDR panorama maps based on limited field-of-view LDR unconstrained images. Datasets are also available publically. The generated map is provided for use as described above herein as a lighting estimation of the original scene and from which shadows, and other light parameters associated with direction and/or color of light can be determined.

Figure 5:
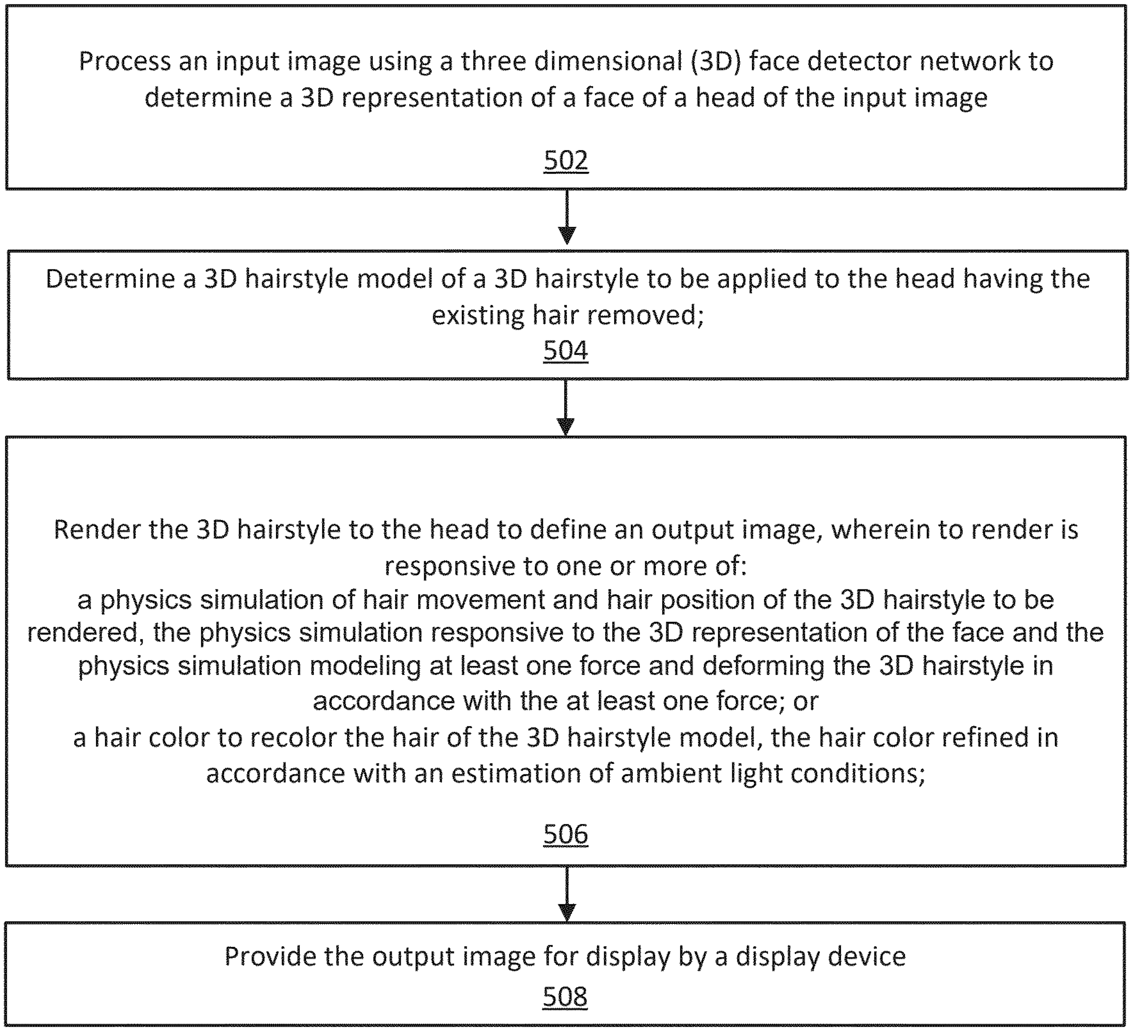
FIG. 5 is a flowchart of operations in accordance with an embodiment.

FIG. 5 is a flowchart of operations in accordance with a respective embodiment. The operations are performed by a system, for example, at least one computing device having at least one processor; and at least one memory device storing computer readable instructions that, when executed by the at least one processor, cause the system to perform the operations. With reference to FIG. 5, operations 500 show, at 502, processing an input image using a three dimensional (3D) face detector network to determine a position, a rotation and a 3D representation of a face, the input image comprising the face of a head having any existing hair. At 504, removing the existing hair from the head. At 506, determining a 3D hairstyle model of a 3D hairstyle to be applied to the head having the existing hair removed. At 508, rendering the 3D hairstyle to the head to define an output image. To render is responsive to one or more of: i) a physics simulation of the hair movement and hair position as applied to the head, the physics simulation modeling at least one force and deforming the 3D hairstyle model in response; or ii) a hair color to recolor the hair of the 3D hairstyle model, the hair color refined in accordance with an estimation of ambient light conditions. And at 510 providing the output image for display by a display device. In an embodiment, modeling is responsive to at least some of the position of the face, the rotation of the face, the 3D representation of the face. In an embodiment, modeling is responsive to at least some of the position of the face, the rotation of the face, the 3D representation of the face. It will be understood that operations similar to operations 500, such as in an embodiment, can be performed where rendering using the 3D hairstyle model is responsive to a physics simulation or to a hair coloring that changes the color of a 3D hairstyle model. Further, hair coloring, if performed, either with or without also performing a physics simulation, can be responsive or not to ambient lighting conditions.

The system can, in an embodiment, comprise a laptop, smartphone, tablet, desktop, server or other computing device.

Figure 6:
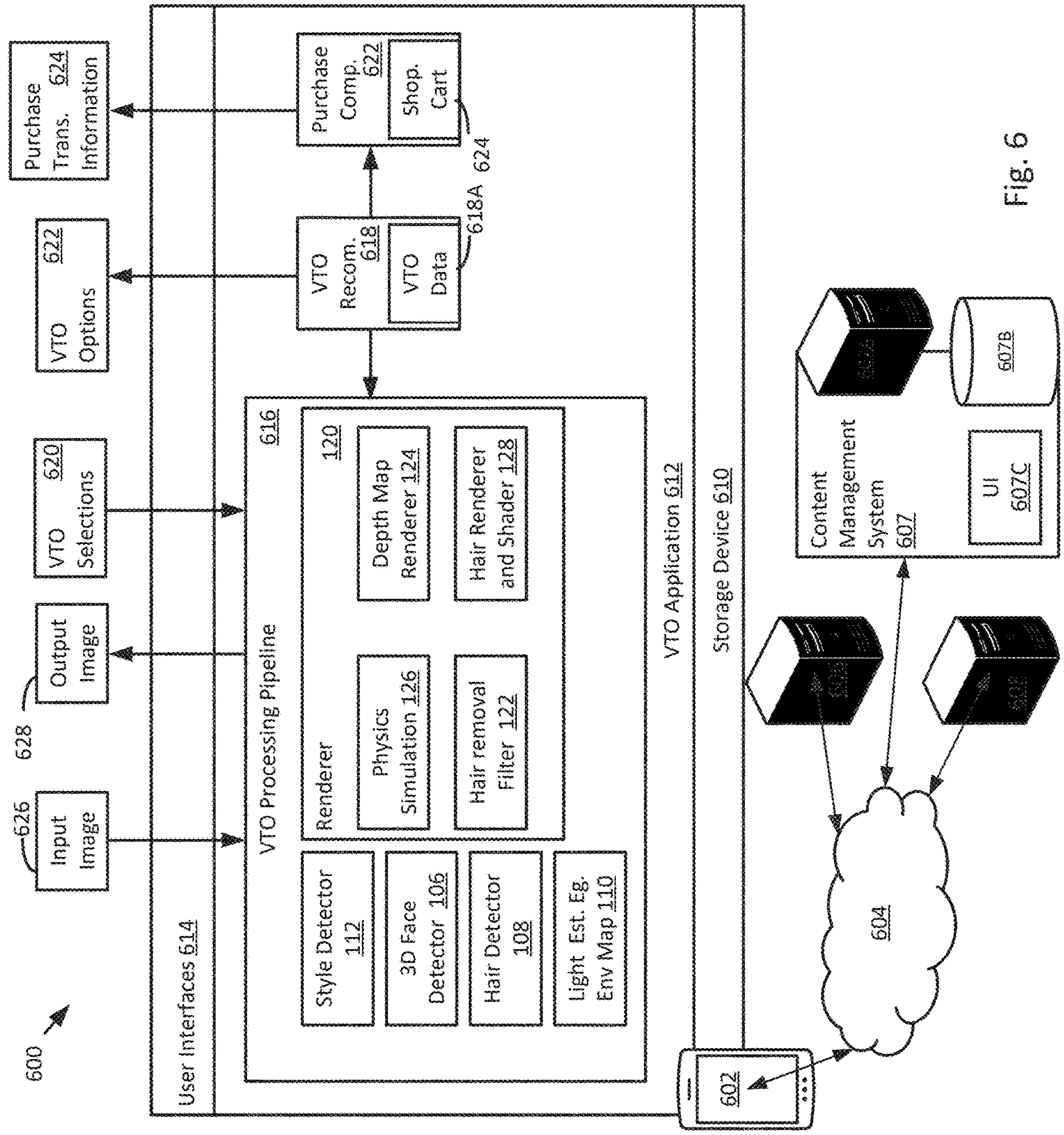
FIG. 6 is an illustration of a computing environment comprising one or more systems, in accordance with an embodiment.

FIG. 6 is an illustration of a computing environment 600 comprising one or more systems, in accordance with an embodiment, such as for practicing one or more method aspects in which operations are performed such as those of FIG. 5.

Computing environment 600 shows a user computing device 602 (e.g. a system), such as a smartphone, a communications network 604, a server 606 and a server 608. Communications network 604 comprises wired and/or wireless networks, which may be public or private and may include, for example, the internet. Server 606 comprises a server computing device such as for providing a website. Server 608 comprises a server computing device such as for providing e-commerce transaction services. Though shown separately, the servers 606 and 608 can comprise one server device. Computing environment is simplified. For example, not shown are payment transaction gateways and other components such as for completing an e-commerce transaction.

Computing device 602 comprise a storage device 610 (e.g., a non-transient device such as a memory and/or solid state drive, etc.) for storing instructions that, when executed by a processor (not shown) such as a central processing unit (CPU), graphics processing unit (GPU) or both, cause the computing device 602 to perform operations such as a computer implemented method. Storage device 610 stores a virtual try on application 612 comprising components such as software modules providing, a user interface 614, VTO processing pipeline 616, a VTO recommendation component 618 with VTO data 618A, and a purchasing component 622 with shopping cart 624 (e.g. purchase data). In an embodiment, not shown, the VTO application is without a recommendation component and/or a purchasing component, for example, providing a VTO selection component for selecting VTO options to visualize as VTO effects. In an embodiment, the VTO application is a 3D hair VTO using physics simulation. VTO data 618A may comprise hair color data (e.g. such as one or more swatches like swatch 300), associated product data, 3D hairstyle model data for 3D hairstyle try on, etc. Such data may be obtained and or stored in a database or other data store.

In an embodiment, VTO application 612 is a web-based application such as is obtained from server 606. In an embodiment, the VTO application 612 such as for a native application is provided by a content distribution network. VTO data 618A can be obtained from a content management system 607, associated with server 607A. Content management system 607 includes a data store 607B storing VTO related data, for example, swatch data and rendering effects data, 3D hairstyle model data, etc. in an embodiment, VTO data, particularly color related data is associated with real world products. Such a VTO experience enables a user to simulate a try on of a real world product, for example, using a desired 3D hairstyle. VTO data (e.g. color etc.) can be provided to a server in other manners such as in the form of color or other parameters. For example, sliders can provide input that is mapped to data values. In an embodiment, VTO data can be provided to a user device (e.g. 602) by way of inclusion in a native application bundle and provided in the form of updates to a native application such as by server 606. VTO data thus can be provided from different sources. Rendering effects data can comprise data for rendering an effect such as to simulate try on property such as a matte look, a gloss look, etc. A UI 607C to content management system 607 can be provided to a provider of a product such as a brand owner, to upload VTO data (e.g. swatch images) and provide input such as for defining swatch data, product data and/or rendering effect data, 3D hair style model data, etc. In an embodiment, UI 607B is web-based.

Though not shown, user device 602 may store a web-browser for execution of web-based VTO application 612. In an embodiment (not shown), VTO application 612 is a native application in accordance with an operating system (also not shown) and software development requirements that may be imposed by a hardware manufacturer, for example, of the computing device 602. The native application can be configured for web-based communication or similar communications to servers 606, 607A and/or 608, as is known.

FIG. 6 shows various input and output data or information associated with a use of VTO application 612, for example. Such input and output data includes an input image 626 of the user to be processed for a VTO experience, an output image 628 to which product effects are simulated providing a VTO experience, a VTO selection 620 comprising, in an embodiment, user input selecting one or more color effects to be simulated and a selected 3D hair style to which the color(s) is (are rendered), VTO options 622 comprising options for colors and hairstyles to be virtually tried on, for example, for selection by a user of device 602, and purchase transaction information 624 comprising purchase information provided to and/or received from a user to purchase a product. As noted, not all VTO application embodiments include e-commerce capabilities. Though some embodiments reference a swatch as a format for providing a color to be applied, alternatively or in addition, color can be identified in other manners. For example, the color can be determined from existing hair of the user in the input image. The user can provide a second input image—e.g. a color identifying image, which may comprise a face with hair and the VTO application can process the color identifying image to determine hair and extract one or more colors for use to color the 3D hairstyle to be rendered. Color options may be provided in other manners such as a color graph presenting an array of colors, color value input (e.g. text) interface supplying values in accordance with a color representation scheme, etc.

In an embodiment, via one or more of user interfaces 614, VTO product options 622 are presented for selection to virtually try on by simulating effects on an input image 626. In an embodiment the VTO options 622 are derived from or associated to VTO data 618A which can be product data. In an embodiment, the VTO data (e.g. product data) can be obtained from server 606 and provided by the VTO recommendation component 618, which in an embodiment may be a product data parser where user-based recommendations per se are not made. Rather any available product data is made available for use selection. Though not shown, user or other input may be received for use to determine VTO recommendations. The user may be prompted, such as via one of interfaces 614 to provide input for determining recommendations. In an embodiment, the VTO recommendation component 618 communicates with server 606. Server 606, in an embodiment, determines the recommendation based on input received via component 618 and provides VTO data accordingly. User interface 614 can present the VTO options 622, for example, updating the display of the options, responsive to the data received as the user browses or otherwise interacts with the user interface.

In an embodiment, the one or more user interfaces provide instructions and controls to obtain the input image 626, and VTO selection input 620 such as an identification of one or more recommended VTO products to try on. In an embodiment, the input image 326 is a user's face image (e.g. a headshot) typically having hair, which can be a still image or a frame from a video. In an embodiment, the input image 626 can be received from a camera (not shown) of device 602 or from a stored image (not shown). The input image 626 is provided to VTO processing pipeline 616 such as for processing in accordance with operations of FIG. 5 and the components shown within device 102 of FIG. 1 to produce an output image 628 for the VTO. In an embodiment, VTO selection input 620 comprises input selecting hair strands of the 3D hair style model with which to define groups for coloring. More than one color may be selected to try on at the same time, applying to different groups or at different locations in a same group for horizontal or vertical coloring effects, for example.

It is understood that the output image 628 can comprise a frame of a video sequence. User interfaces 614 provide the output image 628. Output image 628, in an embodiment, is presented as a portion of a live stream of successive output images (each an example 628) such as where a selfie video is augment to present an augmented reality experience. In an embodiment, output image 628 can be presented along with the input image 626, such as in a side by side display for comparison. In an embodiment, it can be a before/after "in place" comparison interface where the user move a slider to reveal more of the initial or processed image. In an embodiment, output image 628 can be saved (not shown) such as to storage device 610 and/or shared (not shown) with another computing device.

In an embodiment, (not shown) the input images comprise input images of a video conferencing session and the output images comprise a video that is shared with another participant (or more than one) of a video conferencing session. In an embodiment the VTO application (which may have another name) is a component or plug in of a video conferencing application (not shown) permitting the user of device 602 to present the VTO results (e.g. a new hairstyle and color) during a video conference with one or more other conference participants.

It will be apparent to a person of ordinary skill in the art that numerous aspects and features are disclosed by the embodiments herein. The following numbered statements relate to at least some of these aspects and features.

Statement 1: A system comprising: at least one processor; and at least one memory device storing computer readable instructions that, when executed by the at least one processor, cause the system to: process an input image using a three dimensional (3D) face detector network to determine a 3D representation of a face of a head, the input image comprising the face and the head; determine a 3D hairstyle model of a 3D hairstyle to be applied to the input image; render the 3D hairstyle from the 3D hairstyle model to define an output image, wherein to render is responsive to one or more of: a physics simulation of hair movement and hair position of the 3D hairstyle to be rendered, the physics simulation responsive to the 3D representation of the face and the physics simulation modeling at least one force and deforming the 3D hairstyle in accordance with the at least one force; or a hair color to recolor the hair of the 3D hairstyle model, the hair color refined in accordance with an estimation of ambient light conditions; and provide the output image for display by a display device.

Statement 2: The system of Statement 1, wherein the computer readable instructions that, when executed by the at least one processor, cause the system to provide one or more interfaces to at least one of: receive input identifying one or more of the 3D hairstyle or the hair color for rendering; recommend VTO options comprising one or more of 3D hairstyles or hair colors for selecting to identify for the rendering; perform a transaction to purchase a product associated with the 3D hairstyle or the hair color.

Statement 3: The system of Statement 1, wherein the computer readable instructions that, when executed by the at least one processor, cause the system to represent the head as a 3D representation to which the 3D hairstyle is rendered.

Statement 4: The system of Statement 3, wherein the computer readable instructions that, when executed by the at least one processor, cause the system to remove existing hair from the head; and wherein the rendering renders to the head with the existing hair removed.

Statement 5: The system of Statement 4, wherein to remove the existing hair comprises: processing the input image using a hair segmentation network to provide a hair segmentation mask for the existing hair; and removing the existing hair from the head using the hair segmentation mask.

Statement 6: The system of Statement 4, wherein to remove the existing hair comprises in-painting a scalp portion of the head using a 3D scalp filter to reconstruct a shape of the head, the 3D scalp filter responsive to at least some of a position of the face, a rotation of the face and the 3D representation of the face and the head; and wherein the 3D hairstyle is to be applied to the head as reconstructed.

Statement 7: The system of Statement 6, wherein in-painting the scalp uses a skin color determined from the input image.

Statement 8: The system of Statement 7, wherein the computer readable instructions that, when executed by the at least one processor, cause the system to downsample and dilate an area of the existing hair as detected by the hair segmentation network to remove the existing hair.

Statement 9: The system of Statement 1, wherein the computer readable instructions that, when executed by the at least one processor, cause the system to process the input image to determine at least one of a position of the face or a rotation of the face; and wherein the physics simulation is responsive to at least one of the position of the face or the rotation of the face.

Statement 10: The system of Statement 9, wherein the computer readable instructions that, when executed by the at least one processor, cause the system to define a collision 3D shape representation for at least some objects of the input image, the at least some objects selected from the head, a neck and a shoulder; and wherein the physics simulation of the hair movement and hair position is responsive to one or more collisions of hair strands with the collision 3D shape representation.

Statement 11: The system of Statement 10, wherein the collision 3D shape representation is responsive to at least some of the position of the face, the rotation of the face, the 3D representation of the face, or a 3D representation of the hair according to the 3D hairstyle model.

Statement 12: The system of Statement 9, wherein the 3D hairstyle model models a plurality of hair strands defining the hairstyle, the model comprising an embedded frame to guide the movement of the hair strands, the frame comprising a set of guided strands distributed throughout the model, each hair strand mapped to at least one of the guided strands, each individual hair strand and each individual guided strand extending from a respective individual root of the hair outward in accordance with a shape of the hair model; and wherein the physics simulation determines the hair movement and the hair position of the guided strands according to the at least one force and determines hair movement and hair position of the hair strands according to the mapping to the guided strands.

Statement 13: The system of Statement 12, wherein each guided strand comprises a plurality of particles linked one to the next by line segments, the particles comprising i) anchored particles that only follow a movement or a position of the head and ii) unanchored particles, the movement or position of which are responsive to at least some of: the position of the face, the rotation of the face, the 3D representation of the face, or the at least one force.

Statement 14: The system of Statement 13, wherein the computer readable instructions that, when executed by the at least one processor, cause the system to map each hair strand to two closest guided strands wherein the two closest guided strands for a particular hair strand are determined in response to an evaluation of the physical distance between a vertex of the hair strand and a vertex of the guided strand, and wherein the vertex of the hair strand is between 50% and 80% or preferably 75% the distance along the hair strand and the vertex of the guided strand is between 50% and 80% or preferably 75% there along the guided strand.

Statement 15: The system of Statement 14 wherein for a particular hair strand, mapping comprises mapping each vertex on the particular hair strand to a respective corresponding segment on each of the two closest guided strands.

Statement 16: The system of Statement 13, wherein each of the particles in a guided strand is associated with a respective mass parameter and wherein an acceleration of any one of the particles determined by the physics simulation is responsive to the respective mass parameter of the one of the particles.

Statement 17: The system of Statement 16, wherein a mass of the guided strand is further responsive to the number of hair strands mapped to the guided strand.

Statement 18: The system of Statement 13, wherein the computer readable instructions that, when executed by the at least one processor, cause the system to: define a plurality of reference strands comprising unanchored particles subject to movement by at least one force; assign each guided strand to a respective one of the reference strands; for each respective reference strand: model the at least one force; and apply the at least one force as modeled to the respective reference strand, moving unanchored particles in response; and move respective guided strands around the respective reference strands.

Statement 19: The system of Statement 18, wherein the at least one force comprises one or both of gravity or centrifugal force.

Statement 20: The system of Statement 18, wherein the computer readable instructions that, when executed by the at least one processor, cause the system to model each force of the at least on force as deflections on a respective bendable straight cantilever beam, wherein a fixed end of the beam begins at a location of a closest anchored particle to the root of the associated guided strand.

Statement 21: The system of Statement 20, wherein the at least one force comprises two or more forces and wherein to apply the at least one force comprises moving the unanchored particles according to the addition of deflections from the two or more forces.

Statement 22: The system of Statement 18, wherein the at least one force comprises two or more forces and wherein to apply the at least one force comprises moving the unanchored particles according to the addition of deflections from the two or more forces.

Statement 23: The system of Statement 1, wherein the computer readable instructions that, when executed by the at least one processor, cause the system to process the input image to determine a 3D environmental map defining one or more light sources estimating ambient light for refining the hair color.

Statement 24: The system of Statement 23, wherein the computer readable instructions that, when executed by the at least one processor, cause the system to process the input image using a deep neural network to define the 3D environmental map.

Statement 25: The system of Statement 23, wherein the environmental map is an HDR panoramic image that models the light coming from all directions.

Statement 26: The system of Statement 1, wherein the computer readable instructions that, when executed by the at least one processor, cause the system to render in accordance with a Marschner hair shading model.

Statement 27: The system of Statement 26, wherein the computer readable instructions that, when executed by the at least one processor, cause the system to render in accordance with the Marschner hair shading model adapted to perform in real time, using at least some pre-computed scattering functions for different angle inputs.

Statement 28: The system of Statement 26, wherein the computer readable instructions that, when executed by the at least one processor, cause the system to perform of an approximation of a mathematical integration of a scattering equation over all light directions by performing simplified operations using a plurality of discrete light sources determined from a 3D environmental map generated from the input image that estimates the plurality of discrete light sources.

Statement 29: The system of Statement 28, wherein the computer readable instructions that, when executed by the at least one processor, cause the system to process the input image to determine a 3D environmental map defining one or more light sources estimating ambient light; process the map to detect the brightest spots in the map, find the average color for each spot to determine the light color and intensity and convert each spot into a directional light source.

Statement 30: The system of Statement 1, wherein the computer readable instructions that, when executed by the at least one processor, cause the system to render in accordance with a simulation of indirect lighting, approximating the aggregate behaviour of light rays using statistical models in accordance with a dual scattering technique.

Statement 31: The system of Statement 30, wherein the computer readable instructions that, when executed by the at least one processor, cause the system to adapt to perform in real time by using pre-computed recolorable dual scattering look up tables having an additional color dimension for one channel of the hair color.

Statement 32: The system of Statement 1, wherein the computer readable instructions that, when executed by the at least one processor, cause the system to define a rendered pixel depth map for pixels rendered for the output image, initializing the depth map responsive to pixel depths for the face a neck and at last one shoulder of the input image, and updating the depth map as pixels are rendered to the output image; and using the rendered pixel depth map to determine hair pixel occlusion.

Statement 33: The system of Statement 32, wherein the computer readable instructions that, when executed by the at least one processor, cause the system to skip a rendering of a hair pixel to a location of the output image in response to an evaluating of a depth value of the hair pixel and a depth value from the rendered pixel depth map at the location of the hair pixel, the evaluating indicating the hair pixel is occluded.

Statement 34: The system of Statement 1, wherein the computer readable instructions that, when executed by the at least one processor, cause the system to define the 3D hairstyle model as a hair cards model using 3D rectangular planes; and skip a rendering of a transparent hair pixel to the output image defined from the 3D hairstyle model.

Statement 35: The system of Statement 1, wherein the 3D hairstyle model comprises: a hair cards model defined using 3D rectangular planes; or a hair curves model defined using a set of Bézier curves, with each curve representing a strand of hair.

Statement 36: The system of Statement 1, wherein the 3D hairstyle model comprises a hair curves model defined using a set of Bézier curves, with each curve representing a strand of hair, and wherein the 3D hairstyle model is defined or stored using one or more optimization techniques of: representing at least some of the Bezier curves in a quadratic curve form rather than in a cubic curve where the quadratic curve form approximates the cubic curve form; storing only one of two sides of a symmetric hairstyle, mirroring the other side when the symmetric hairstyle is loaded; or storing curve data in a binary format compressed with a lossless compression technique.

Statement 37: The system of Statement 1, wherein the computer readable instructions that, when executed by the at least one processor, cause the system to: receive a hair swatch representing a desired hair coloring outcome, the swatch comprising a distribution of colors.

Statement 38: The system of Statement 37, wherein the computer readable instructions that, when executed by the at least one processor, cause the system to transfer the distribution of colors from the swatch to a hair texture of the 3D hairs style model using a histogram matching process.

Statement 39: The system of Statement 38, wherein the computer readable instructions that, when executed by the at least one processor, cause the system to provide control over a variation of the hair color, controlling a frequency of variation through blurring the hair texture to reduce details or controlling a scale of variation by adjusting a hair texture mapping of the hair texture to a hair surface which mapping compresses or stretches the hair texture relative to the hair surface.

Statement 40: The system of Statement 38, wherein the computer readable instructions that, when executed by the at least one processor, cause the system to provide control over a coloring of hair roots to control one or both of a color fading or a color choice.

Statement 41: The system of Statement 1, wherein the computer readable instructions that, when executed by the at least one processor, cause the system to soften pixilation of edges of loose strands of hair from the 3D hairstyle model by applying blurring or blending or both blurring and blending.

Statement 42: The system of Statement 1, wherein the computer readable instructions that, when executed by the at least one processor, cause the system to reduce pixilation of all hair strands from the 3D hairstyle model by using a Multisample anti-aliasing (MSAA) technique.

Statement 43: The system of Statement 1, wherein the computer readable instructions that, when executed by the at least one processor, cause the system to render hair at a higher resolution than the output image and downsize to reduce strand size and provide smoothing.

Statement 44: The system of Statement 1, wherein the computer readable instructions that, when executed by the at least one processor, cause the system to apply two or more hair colors to respective hair segments from the 3D hairstyle model, wherein the hair segments are arranged as any of horizontally, vertically, or as root recoloring.

Statement 45: The system of Statement 44, wherein the 3D hairstyle model segments hair strands into multiple groups, and the computer readable instructions that, when executed by the at least one processor, cause the system to apply the two or more hair colors to at least some of the multiple groups.

Statement 46: The system of Statement 45, wherein the respective hair segments are grouped to define non-contiguous clumps of hair strands and the computer readable instructions that, when executed by the at least one processor, cause the system to one or both of: apply a first color to a majority of the clumps and a second color to a group of strands at the front of the head, creating a framing effect for the face; or apply a first color to a majority of clumps of strands throughout the hair and a second color to distributed second clumps of strands throughout the hair, creating a streak highlight effect.

Statement 47: The system of Statement 45, wherein the computer readable instructions that, when executed by the at least one processor, cause the system to smooth out the transition of colors, adjusting colors of adjacent hair strands that do not belong to a same group, and blending the color of the different groups to produce a visually transitional color for adjacent strands.

Statement 48: The system of Statement 44, wherein the computer readable instructions that, when executed by the at least one processor, cause the system to: segment the hair into multiple groups interactively in accordance with user input to identify the multiple groups; and apply the two or more hair colors to at least some of the multiple groups.

Statement 49: The system of Statement 1, wherein the computer readable instructions that, when executed by the at least one processor, cause the system to render shadow pixels simulating shadow cast by hair from the hair model, the shadow pixels responsive to the estimation of the ambient light conditions.

Statement 50: The system of Statement 49, wherein the computer readable instructions that, when executed by the at least one processor, cause the system to: define a first shadow depth map and a second shadow depth map, each defined from the perspective of one or more light sources determined from the estimation of the ambient light conditions, the first shadow depth map defined for the hair and head and the second shadow depth defined for only the hair; and apply shadowing to the hair and head respectively, evaluating, for each of the shadow depth maps, a depth value of a pixel compared against that of a corresponding depth value in the shadow depth maps and if the depth value of the pixel is greater than the depth value in the depth maps, then the pixel is considered in shadow pixel.

Statement 51: The system of Statement 49, wherein for a shadow pixel cast on a hair pixel, the computer readable instructions that, when executed by the at least one processor, cause the system to blend a shadow color of the shadow pixel with a final hair color of the hair pixel on which the shadow is cast.

Statement 52: The system of Statement 51, wherein the shadow pixel is determined by the average of its neighbors.

Statement 53: The system of Statement 49, wherein for a shadow pixel cast on a head pixel, the computer readable instructions that, when executed by the at least one processor, cause the system to apply a shadow color of the shadow pixel in a head shape on a blank image.

Statement 54: The system of Statement 53, wherein for a shadow pixel cast on a head pixel, the computer readable instructions that, when executed by the at least one processor, cause the system to apply a Gaussian blur to the blank image to smooth out shadow pixels at the edges, and render the shadow pixels as smoothed onto the head in the output image.

Statement 55: A computer-implemented method comprising: obtaining a 3D hairstyle model of a 3D hairstyle to render to the input image to produce an output image, the 3D hairstyle model comprising a plurality of hair strands; responsive to a 3D representation of i) a face, or ii) a face and a head in the input image, simulating and applying at least one force to deform at least some of the hair strands; and rendering the output image for display using the 3D hairstyle model as deformed.

Statement 56: The method of Statement 55 comprising determining the 3D representation of i) the face, or ii) the face and the head in the input image using one or more deep neural networks.

Statement 57: The method of Statement 55 comprising applying a hair color to the 3D hairstyle model as deformed, the applying being responsive to ambient light conditions as determined from the input image.

Statement 58: The method of Statement 57: comprising determine a 3D environmental map defining one or more light sources to estimate the ambient light conditions for refining the hair color.

Statement 59: The method of Statement 57, wherein the rendering is responsive to one or both of a hair shading model or a light scattering model to refine the hair color.

Statement 60: The method of Statement 55 comprising modelling one or more collisions of the hair strands with the face or the face and the head and wherein the rendering is responsive to the one or more collisions.

Statement 61: The method of Statement 55 comprising modelling one or more occlusions of the hair strands with the face or the face and the head in accordance with a pixel depth map and wherein the rendering is responsive to the one or more occlusions.

Statement 62: The method of Statement 55 comprising modelling one or more shadows and wherein the rendering is responsive to the one or more shadows.

Statement 63: The method of Statement 55, wherein the 3D hairstyle model defines the hair strands into two or more groups and wherein the method comprises applying two or more hair colors to the hair strands wherein at least one of the groups is colored with a different color that another or others of the groups.

Statement 64: The method of Statement 55, wherein the 3D hairstyle model defines the hair strands into a plurality of hair segments and wherein the method comprises applying a hair color in accordance with the hair segments to apply hair coloring horizontally, vertically or for root coloring.

Practical implementation may include any or all of the features described herein. These and other aspects, features and various combinations may be expressed as methods, apparatus, systems, means for performing functions, program products, and in other ways, combining the features described herein. A number of embodiments have been described. Nevertheless, it will be understood that various modifications can be made without departing from the spirit and scope of the processes and techniques described herein. In addition, other steps can be provided, or steps can be eliminated, from the described process, and other components can be added to, or removed from, the described systems. Accordingly, other embodiments are within the scope of the following claims.

Throughout the description and claims of this specification, the word “comprise”, “contain” and variations of them mean “including but not limited to” and they are not intended to (and do not) exclude other components, integers or steps. Throughout this specification, the singular encompasses the plural unless the context requires otherwise. In particular, where the indefinite article is used, the specification is to be understood as contemplating plurality as well as singularity, unless the context requires otherwise. References to an operation or component involving “one or more” of a thing or things as set forth do not require a component or an operation to be configured to handle a plurality of the thing or things as set forth but include components or operations configured to handle a single thing or one of the things only.

Features, integers, characteristics, or groups described in conjunction with a particular aspect, embodiment or example of the invention are to be understood to be applicable to any other aspect, embodiment or example unless incompatible therewith. All of the features disclosed herein (including any accompanying claims, abstract and drawings), and/or all of the steps of any method or process so disclosed, may be combined in any combination, except combinations where at least some of such features and/or steps are mutually exclusive. The invention is not restricted to the details of any foregoing examples or embodiments. The invention extends to any novel one, or any novel combination, of the features disclosed in this specification (including any accompanying claims, abstract and drawings) or to any novel one, or any novel combination, of the steps of any method or process disclosed.

The invention claimed is:

1. A system comprising:

at least one processor; and at least one memory device storing computer readable instructions that, when executed by the at least one processor, cause the system to:

process an input image using a three dimensional (3D) face detector network to determine a 3D representation of a face of a head, the input image comprising the face and the head;

determine a 3D hairstyle model of a 3D hairstyle to be applied to the input image;

render the 3D hairstyle from the 3D hairstyle model to define an output image, wherein to render is responsive to one or more of:

a physics simulation of hair movement and hair position of the 3D hairstyle to be rendered, the physics simulation responsive to the 3D representation of the face and the physics simulation modeling at least one force and deforming the 3D hairstyle in accordance with the at least one force; or a hair color to recolor the hair of the 3D hairstyle model, the hair color refined in accordance with an estimation of ambient light conditions; and provide the output image for display by a display device, wherein the computer readable instructions, when executed by the at least one processor, further cause the system to:

represent the head as a 3D representation to which the 3D hairstyle is rendered;

remove existing hair from the head; and wherein the rendering renders to the head with the existing hair removed, wherein one or both of:

to remove the existing hair comprises processing the input image using a hair segmentation network to provide a hair segmentation mask for the existing hair and removing the existing hair from the head using the hair segmentation mask; or to remove the existing hair comprises in-painting a scalp portion of the head using a 3D scalp filter to reconstruct a shape of the head, the 3D scalp filter responsive to at least some of a position of the face, a rotation of the face and the 3D representation of the face and the head; and wherein the 3D hairstyle is to be applied to the head as reconstructed.

2. The system of claim 1, wherein the computer readable instructions, when executed by the at least one processor, further cause the system to provide one or more interfaces to at least one of:

receive input identifying one or more of the 3D hairstyle or the hair color for rendering;

recommend VTO options comprising one or more of 3D hairstyles or hair colors for selecting to identify for the rendering;

perform a transaction to purchase a product associated with the 3D hairstyle or the hair color.

3. The system of claim 1, wherein one or both of: i) in-painting the scalp uses a skin color determined from the input image; or ii) the computer readable instructions, when executed by the at least one processor, further cause the system to downsample and dilate an area of the existing hair as detected by the hair segmentation network to remove the existing hair.

4. The system of claim 1, wherein the computer readable instructions, when executed by the at least one processor, further cause the system to process the input image to determine at least one of a position of the face or a rotation of the face; and wherein the physics simulation is responsive to at least one of the position of the face or the rotation of the face.

5. The system of claim 1, wherein one or both of:

a. the 3D hairstyle model comprises: a hair cards model defined using 3D rectangular planes; or a hair curves model defined using a set of Bézier curves, with each curve representing a strand of hair; or b. wherein the 3D hairstyle model comprises a hair curves model defined using a set of Bézier curves, with each curve representing a strand of hair, and wherein the 3D hairstyle model is defined or stored using one or more optimization techniques of:

representing at least some of the Bézier curves in a quadratic curve form rather than in a cubic curve where the quadratic curve form approximates the cubic curve form;

storing only one of two sides of a symmetric hairstyle, mirroring the other side when the symmetric hairstyle is loaded; or storing curve data in a binary format compressed with a lossless compression technique.

6. A system comprising:

at least one processor; and at least one memory device storing computer readable instructions that, when executed by the at least one processor, cause the system to:

process an input image using a three dimensional (3D) face detector network to determine a 3D representation of a face of a head, the input image comprising the face and the head;

determine a 3D hairstyle model of a 3D hairstyle to be applied to the input image;

render the 3D hairstyle from the 3D hairstyle model to define an output image, wherein to render is responsive to a physics simulation of hair movement and hair position of the 3D hairstyle to be rendered, the physics simulation responsive to the 3D representation of the face and the physics simulation modeling at least one force and deforming the 3D hairstyle in accordance with the at least one force; and provide the output image for display by a display device, wherein the computer readable instructions, when executed by the at least one processor, further cause the system to;

process the input image to determine at least one of a position of the face or a rotation of the face; and wherein the physics simulation is responsive to at least one of the position of the face or the rotation of the face; and define a collision 3D shape representation for at least some objects of the input image, the at least some objects selected from the head, a neck and a shoulder; and wherein the physics simulation of the hair movement and hair position is responsive to one or more collisions of hair strands with the collision 3D shape representation.

7. The system of claim 6, wherein the collision 3D shape representation is responsive to at least some of the position of the face, the rotation of the face, the 3D representation of the face, or a 3D representation of the hair according to the 3D hairstyle model.

8. A system comprising:

at least one processor; and at least one memory device storing computer readable instructions that, when executed by the at least one processor, cause the system to:

process an input image using a three dimensional (3D) face detector network to determine a 3D representation of a face of a head, the input image comprising the face and the head;

determine a 3D hairstyle model of a 3D hairstyle to be applied to the input image;

render the 3D hairstyle from the 3D hairstyle model to define an output image, wherein to render is responsive to a physics simulation of hair movement and hair position of the 3D hairstyle to be rendered, the physics simulation responsive to the 3D representation of the face and the physics simulation modeling at least one force and deforming the 3D hairstyle in accordance with the at least one force; and provide the output image for display by a display device, wherein the 3D hairstyle model models a plurality of hair strands defining the hairstyle, the model comprising an embedded frame to guide the movement of the hair strands, the frame comprising a set of guided strands distributed throughout the model, each hair strand mapped to at least one of the guided strands, each individual hair strand and each individual guided strand extending from a respective individual root of the hair outward in accordance with a shape of the hair model; and wherein the physics simulation determines the hair movement and the hair position of the guided strands according to the at least one force and determines hair movement and hair position of the hair strands according to the mapping to the guided strands.

9. The system of claim 8, wherein each guided strand comprises a plurality of particles linked one to the next by line segments, the particles comprising i) anchored particles that only follow a movement or a position of the head and ii) unanchored particles, the movement or position of which are responsive to at least some of: the position of the face, the rotation of the face, the 3D representation of the face, or the at least one force.

10. The system of claim 9, wherein the computer readable instructions, when executed by the at least one processor, further cause the system to map each hair strand to two closest guided strands wherein the two closest guided strands for a particular hair strand are determined in response to an evaluation of the physical distance between a vertex of the hair strand and a vertex of the guided strand, and wherein the vertex of the hair strand is between 50% and 80% or preferably 75% the distance along the hair strand and the vertex of the guided strand is between 50% and 80% or preferably 75% there along the guided strand.

11. The system of claim 10, wherein for a particular hair strand, mapping comprises mapping each vertex on the particular hair strand to a respective corresponding segment on each of the two closest guided strands.

12. The system of claim 9, wherein each of the particles in a guided strand is associated with a respective mass parameter and wherein an acceleration of any one of the particles determined by the physics simulation is responsive to the respective mass parameter of the one of the particles.

13. The system of claim 12, wherein a mass of the guided strand is further responsive to the number of hair strands mapped to the guided strand.

14. The system of claim 8, wherein the computer readable instructions, when executed by the at least one processor, further cause the system to:

define a plurality of reference strands comprising unanchored particles subject to movement by at least one force;

assign each guided strand to a respective one of the reference strands;

for each respective reference strand:

model the at least one force; and apply the at least one force as modeled to the respective reference strand, moving unanchored particles in response; and move respective guided strands around the respective reference strands.

15. The system of claim 14, wherein the at least one force comprises one or both of gravity or centrifugal force.

16. The system of claim 14, wherein the computer readable instructions, when executed by the at least one processor, further cause the system to model each force of the at least on force as deflections on a respective bendable straight cantilever beam, wherein a fixed end of the beam begins at a location of a closest anchored particle to the root of the associated guided strand.

17. The system of claim 16, wherein the at least one force comprises two or more forces and wherein to apply the at least one force comprises moving the unanchored particles according to the addition of deflections from the two or more forces.

18. The system of claim 14, wherein the at least one force comprises two or more forces and wherein to apply the at least one force comprises moving the unanchored particles according to the addition of deflections from the two or more forces.

19. A system comprising:

at least one processor; and at least one memory device storing computer readable instructions that, when executed by the at least one processor, cause the system to:

process an input image using a three dimensional (3D) face detector network to determine a 3D representation of a face of a head, the input image comprising the face and the head;

determine a 3D hairstyle model of a 3D hairstyle to be applied to the input image;

render the 3D hairstyle from the 3D hairstyle model to define an output image, wherein to render is responsive to one or more of:

a physics simulation of hair movement and hair position of the 3D hairstyle to be rendered, the physics simulation responsive to the 3D representation of the face and the physics simulation modeling at least one force and deforming the 3D hairstyle in accordance with the at least one force; or a hair color to recolor the hair of the 3D hairstyle model, the hair color refined in accordance with an estimation of ambient light conditions; and provide the output image for display by a display device, wherein the computer readable instructions, when executed by the at least one processor, further cause the system to define a rendered pixel depth map for pixels rendered for the output image, initializing the depth map responsive to pixel depths for the face, a neck and at last one shoulder of the input image, and updating the depth map as pixels are rendered to the output image; and using the rendered pixel depth map to determine hair pixel occlusion.

20. The system of claim 19, wherein the computer readable instructions, when executed by the at least one processor, further cause the system to skip a rendering of a hair pixel to a location of the output image in response to an evaluating of a depth value of the hair pixel and a depth value from the rendered pixel depth map at the location of the hair pixel, the evaluating indicating the hair pixel is occluded.

21. A system comprising:

at least one processor; and at least one memory device storing computer readable instructions that, when executed by the at least one processor, cause the system to:

process an input image using a three dimensional (3D) face detector network to determine a 3D representation of a face of a head, the input image comprising the face and the head;

determine a 3D hairstyle model of a 3D hairstyle to be applied to the input image;

render the 3D hairstyle from the 3D hairstyle model to define an output image, wherein to render is responsive to one or more of:

a physics simulation of hair movement and hair position of the 3D hairstyle to be rendered, the physics simulation responsive to the 3D representation of the face and the physics simulation modeling at least one force and deforming the 3D hairstyle in accordance with the at least one force; or a hair color to recolor the hair of the 3D hairstyle model, the hair color refined in accordance with an estimation of ambient light conditions; and provide the output image for display by a display device, wherein the computer readable instructions, when executed by the at least one processor, further cause the system to define the 3D hairstyle model as a hair cards model using 3D rectangular planes; and skip a rendering of a transparent hair pixel to the output image defined from the 3D hairstyle model.

22. A system comprising:

at least one processor; and at least one memory device storing computer readable instructions that, when executed by the at least one processor, cause the system to:

process an input image using a three dimensional (3D) face detector network to determine a 3D representation of a face of a head, the input image comprising the face and the head;

determine a 3D hairstyle model of a 3D hairstyle to be applied to the input image;

render the 3D hairstyle from the 3D hairstyle model to define an output image, wherein to render is responsive to one or more of:

a physics simulation of hair movement and hair position of the 3D hairstyle to be rendered, the physics simulation responsive to the 3D representation of the face and the physics simulation modeling at least one force and deforming the 3D hairstyle in accordance with the at least one force; or a hair color to recolor the hair of the 3D hairstyle model, the hair color refined in accordance with an estimation of ambient light conditions; and provide the output image for display by a display device, wherein the computer readable instructions, when executed by the at least one processor, further cause the system to apply two or more hair colors to respective hair segments from the 3D hairstyle model, wherein the hair segments are arranged as any of horizontally, vertically, or as root recoloring.

23. The system of claim 22, wherein one or both of:

a. the 3D hairstyle model segments hair strands into multiple groups, and the computer readable instructions that, when executed by the at least one processor, cause the system to apply the two or more hair colors to at least some of the multiple groups; or b. the computer readable instructions that, when executed by the at least one processor, cause the system to:

segment the hair into multiple groups interactively in accordance with user input to identify the multiple groups; and apply the two or more hair colors to at least some of the multiple groups.

24. The system of claim 23, wherein the respective hair segments are grouped to define non-contiguous clumps of hair strands and the computer readable instructions, when executed by the at least one processor, further cause the system to one or both of:

apply a first color to a majority of the clumps and a second color to a group of strands at the front of the head, creating a framing effect for the face; or apply a first color to a majority of clumps of strands throughout the hair and a second color to distributed second clumps of strands throughout the hair, creating a streak highlight effect.

25. The system of claim 23, wherein the computer readable instructions, when executed by the at least one processor, further cause the system to smooth out the transition of colors, adjusting colors of adjacent hair strands that do not belong to a same group, and blending the color of the different groups to produce a visually transitional color for adjacent strands.

* * * * *